United States Patent Office 2,816,866
Patented Dec. 17, 1957

2,816,866

METHOD OF CONTROLLING THE VISCOSITY OF DRILLING MUDS

Hendrik Van Olphen, Bellaire, Tex., assignor to Shell Development Company, New York, N. Y., a corporation of Delaware No Drawing. Application January 25, 1954, Serial No. 406,053

7 Claims. (Cl. 252—8.5)

This invention relates to the drilling of oil and gas wells and pertains more particularly to a method of reducing the viscosity of drilling fluids of the type used in the rotary method of drilling wells.

In normal well drilling operations, wherein a well is drilled by the rotary method, the well borehole is generally filled by a drilling fluid or mud which is circulated therein. Drilling muds are usually pumped down through the drill stem of the rotary rig and around the drill bit, returning to the surface through the annular passage between the drill stem and the well casing. These drilling muds perform a number of functions, including forming a substantially impermeable filter cake on the walls of the borehole to prevent the loss of fluid into the formation penetrated, lubricating the drill stem and bit, carrying the cuttings from the bit up the borehole to the surface, and providing a hydrostatic head against the walls of the well to prevent the uncontrolled escape of gases or liquids from the formations traversed by the borehole.

Prime requisites of a satisfactory drilling fluid are good flow properties and good plastering or sheath-forming characteristics. A good drilling fluid must form on the walls of the borehole a mud sheath for effectively preventing any appreciable fluid loss to the formation. A loss of fluid to the formation is undesirable at any time during drilling, being especially objectionable when drilling into the producing zone, which may be contaminated and plugged by said fluid.

In order to perform the desired functions, the drilling fluid must have a sufficiently high gel strength to avoid the settling of weighting agents which are added to increase the density of the mud. At the same time, it is desirable that the viscosity of the mud is low enough to secure high rates of circulation so that the bit cuttings may be carried to the surface by the stream of drilling fluid. A substantial increase in the viscosity and/or gel strength of a drilling fluid is undesirable as it tends to overload the mud pumps that circulate the drilling fluid within the well and proper circulation rate cannot be maintained.

The properties of a drilling fluid undergo changes during drilling due to the fact that the borehole traverse strata of shales, clays, etc., which become dispersed in the fluid. When the strata encountered contain certain clays or materials such as alkaline earth metal compounds, particularly calcium compounds, or when cement is being drilled out, the drilling fluid is liable to become too viscous. In drilling operations in many oil fields, it is necessary to maintain a close watch on the drilling fluid so as to note changes in the viscosity of the fluid. On observing any substantial change, the drilling fluid may be treated with chemicals so as to counteract the effect of contaminants.

When the drilling fluid has become too viscous, it is necessary to add a viscosity-reducing agent. However, some of the materials commonly employed suffer from the disadvantage of being subject to hydrolysis, which reduces their effectiveness for this purpose. This is particularly true of the alkali metal polyphosphates, such as sodium tetraphosphate. Since the products of hydrolysis are relatively ineffective as viscosity-reducers, it becomes necessary to repeat the treatment at regular intervals, the frequency of the treatment being governed by the rate of hydrolysis of the treating agent. This continued treatment results in the gradual increase in the concentration of the hydrolysis products. Since the hydrolysis products of many commonly used treating agents are inorganic salts, high concentrations of which are effective flocculating agents for clays, a point is soon reached where further treatment is of no value because the effect of the additional treating agent is not sufficient to overcome the flocculating action of the salts already present in the mud.

Viscosity of a drilling fluid may also be reduced by diluting the suspending medium of the fluid. Thus, a viscous water-base drilling fluid may be diluted by the addition of water thereto, while an oil-in-water emulsion may be diluted by the addition of more water and/or oil. However, viscosity reduction of a drilling fluid by the addition of more water or oil is undesirable since it reduces the weight of the mud.

It is, therefore, an object of the present invention to provide a method for reducing excessive viscosity of a drilling fluid which does not rely on the mere dilution of the drilling fluid with additional amounts of suspending media.

A further object of this invention is to provide a method for reducing the viscosity of a drilling fluid by the addition of an agent thereto which is not subject to hydrolysis.

Another object of this invention is to provide for reducing the viscosity of a drilling fluid without altering the weight of the drilling fluid.

Another object of the present invention is to provide a method for reducing excessive viscosity of a drilling fluid without adversely affecting the stability or plastering properties of the drilling fluid.

Another object of this invention is to provide a method of reducing the viscosity of a drilling fluid which is subjected to high well temperatures and possible contamination during drilling operations.

These and other objects of this invention will be understood from the following description of the invention:

The terms water-base drilling fluid, aqueous-base drilling fluid or water-containing drilling fluid employed herein and in the appended claims include oil-in-water emulsions wherein either the aqueous or the non-aqueous fluid component may vary in proportions from 1 to 50% of the total fluid phase, as well as water-base drilling fluids having a liquid base substantially comprising only water or salt water.

The present invention is predicated upon the discovery that the viscosity of aqueous-base drilling fluids may be reduced by the addition thereto or the inclusion therein of small quantities of an alkali metal salt of ethylene diamine tetraacetic acid. This also includes the addition of ethylene diamine tetraacetic acid to an aqueous drilling fluid. Since drilling fluids are normally basic, a salt of the ethylene diamine tetraacetic acid will be formed upon addition of the acid to the drilling fluid. The salts of the present invention are known in the U. S. under the trade names of "Versenes" or "Sequestrenes," while in Europe, they are referred to as "Komplexonen."

The present invention can be practiced by adding a small quantity (0.02 to 3.0% by weight) of an alkali metal salt of ethylene diamine tetraacetic acid to drilling fluids of the water-base type or of the oil-in-water emulsion type which may or may not contain other emulsifying agents. In accordance with the present invention, drilling fluids or emulsions may be prepared by adding small quantities of either monosodium, disodium, trisodium, or tetrasodium (or potassium) ethylene diamine tetraacetate to a water-containing drilling fluid or emulsion which also contains colloidal material in the form of clay. By the addition of an alkali metal salt of ethylene diamine tetraacetic acid to a viscous water-base mud, a temperature stable thinning of the mud is achieved.

The theory of the action of thinning agents arises from a consideration of the nature and distribution of electrical charges on the edges of plate-like clay particles which form one component of a drilling fluid. It is considered that the anions of mud thinning agents are adsorbed at the edges of the clay particles, where the broken tetrahedral silica and octahedral alumina-magnesia sheets are exposed. These adsorbed anions are thought to provide the edges of the clay particles with a repulsive negative charge which prevents network (gel) formation by edgewise association, thus reducing the viscosity and yield-stress of the suspension. This anion adsorption is thought to be achieved by linking with the aluminum ions. When ferric or magnesium ions are also exposed, as is often the case, similar linking may also occur.

Thus, by the addition of an alkali metal salt of ethylene diamine tetraacetic acid to a water-base drilling mud, the salt forms unusually stable complexes with the alkaline earths and heavy metals. This action takes place best in drilling fluids that are slightly alkaline. The salts react with most di- or trivalent metallic ions to form soluble metal complexes or chelate compounds. The strength of these chelate compounds is so great that the metallic ions are completely inactivated and no longer react as metallic ions, that is, they cannot be precipitated by common precipitating agents.

Salts of ethylene diamine tetraacetic acid have a thinning effect on drilling fluids and improve their plastering qualities. The action of the salt is similar to that of the polyphosphates. However, unlike the polyphosphates, the viscosity reducing effect of the present salts of ethylene diamine tetraacetic acid is enhanced by an increase in the temperature of the fluid. This is an important characteristic which permits the use of the present salts as viscosity reducing agents in aqueous drilling fluids which are employed in wells being drilled to great depths where high formation temperatures are encountered. Thus, conventional water-base muds which have small quantities of an alkali metal salt of ethylene diamine tetraacetic acid added thereto, may be employed in wells of greater depths, thus obviating the need for using a lime-treated red mud, as is now the general practice.

Drilling fluids may comprise several components which commonly include a suspending component or medium, a suspended component and/or plastering agent, and an emulsifying or stabilizing agent if the fluid is in the form of an emulsion. In the case of an oil-in-water emulsion, the oil may be in the form of any suitable non-aqueous liquid, such as the mineral oil, diesel oil, fuel oil, kerosene, stove oil, and the like. A plastering-improving clay like bentonite is commonly incorporated in the drilling fluid. In addition to clay, a suspended component in the form of a weighting material is often added in order to add weight to the drilling fluid to overcome any formation pressures encountered during drilling operations. Weighting materials commonly used are crushed oyster shells, barite, hematite, magnetite, etc. The weighting material may constitute a substantial portion by weight of the drilling fluid, for example, in the range of 5 to 60%. In the case of drilling emulsions, 0.5 to 5% of a suitable emulsifying agent is used, for example, soaps of fattty acids, rosin acid, and the like. In general, excellent emulsions may be obtained with most of the soaps when about 1% (by weight) of the emulsifier is used. In most cases, no emulsifier need be added as the present salts act as emulsifiers.

In one test, a water-base mud was made up using a Texas bentonite clay having sodium and calcium ions as exchangeable ions. The base-exchange capacity of the raw bentonite was 76 milli-equivalents per 100 grams. The mud contained approximately 25% by weight of the clay and weighed 70 lb./cu. ft. This mud was tested for filter loss characteristics by the approved API test at room temperature and after being heated at 170° C. for 14 hours. A portion of this 70 lb. mud was treated with 0.4% of the tetrasodium salt of ethylene diamine tetraacetic acid which was added as a 55% solution. The treated and untreated portions of the mud were tested as to filter loss and the results are shown in Table 1. It may be seen that there was considerable decrease in the filter loss of that portion of mud which had been treated in accordance with the present invention.

*Table 1*

| 70 Lb./Cu. Ft. Mud | Conditions | 30 Minutes API Filter Loss (ml.) |
|---|---|---|
| No treatment | Room Temp | 22.5 |
| | 14 hrs., 170° C | 25.8 |
| 0.4% tetrasodium salt A added | Room Temp | 15.2 |
| | 14 hrs., 70° C | 15.2 |
| | 14 hrs., 170° C | 20.0 |

In a second series of tests, the gel strength and the yield stress or viscosity of an untreated 70 lb./cu. ft. water-base mud were compared with other portions of the same mud to which had been added small quantities of two different brands (designated as A and B) of tetrasodium ethylene diamine tetraacetate, while Calgon or sodium hexametaphosphate was added to another portion of the mud. Some of the tests were carried out at room temperature, while in other tests the samples were exposed to temperatures of 70 and 170° C. for 14 hours. The results are shown in Table 2.

*Table 2*

| 70 Lb. Mud and Treatment | Conditions | Bingham Yield Stress | 10 Minute Gel Strength |
|---|---|---|---|
| No treatment | Room Temp | 146 | 54 |
| | 14 hrs., 170° C | 28 | |
| 0.4% tetrasodium salt A added | Room Temp | 55 | 37 |
| | 14 hrs., 70° C | 10 | |
| | 14 hrs., 170° C | 5 | |
| 0.4% tetrasodium salt B added | Room Temp | 25 | 34 |
| | 14 hrs., 70° C | 5 | |
| | 14 hrs., 170° C | 5 | |
| 0.4% sodium hexametaphosphate | 14 hrs., 170° C | 62 | 210 |

The Bingham yield stress figure in each test is obtained by extending a viscosity curve so that it intercepts the shear stress axis of a shear stress vs. rate of shear plot. The thinning effect of mud treating chemicals in the past was thought to manifest itself in viscosity reduction of the drilling mud. This terminology remains in popular usage in the art of drilling muds today, so that chemicals employed for thinning muds are generally referred to as being used to reduce the viscosity of the drilling mud. More recently, however, the thinning action of a viscosity reducing chemical has been shown to be primarily a matter of reduction of the Bingham yield stress, which is the important property as far as the thinning action of the chemical in the mud is concerned.

From Table 2, it may be seen that the 70 lb. mud having a shear stress of 146 dynes per cm.$^2$ when untreated, had this value reduced to 55 and 25 dn./cm.$^2$ for the two portions of mud that were treated according to the present invention. After the samples had been heated to 170° C. for 14 hours, there was continued reduction in the yield stress figures for the treated portions to a value of 5, whereas the untreated portion decreased to a lesser amount, giving a figure of 28 dn./cm.$^2$ In comparing the salts of the present invention with normal viscosity reducing agents, such as Calgon, a portion of the mud containing a small quantity of Calgon was heated under conditions obtaining in many high-temperature wells. While the yield stress value of the muds treated with the present salts were substantially reduced upon heating, the yield stress of the mud including the Calgon, increased considerably to 62 dn./cm.$^2$ In a like manner, there was an abnormal increase in the 10 minute gel strength of the mud containing the phosphate to a value of 210 dn./cm.$^2$ The Bingham yield stress figures and the 10 minute gel strengths values of the muds were measured with a modified Stormer viscometer.

In another series of tests, the effect of solutions of different brands of salts of ethylene diamine tetraacetic acid was tested on muds made up by using four different clays.

Table 3

| Mud Base | Treating Agent | Conditions | 10 Min. Gel Strength in Dynes/cm$^2$. at Following Weight Concentrations of Agents | | |
|---|---|---|---|---|---|
| | | | 0 (Blank) | 0.4% | 1.6% |
| Clay No. 1 | Tetrasodium salt A | Room Temp | 250 | 60 | |
| Clay No. 2 | Tetrasodium salt A | Room Temp | 255 | 180 | 120 |
| | | 14 hrs., 70° C | 250 | 160 | |
| | Tetrasodium salt B | Room Temp | 255 | 228 | 70 |
| | | 14 hrs., 70° C | 250 | 100 | |
| Clay No. 3 | Tetrasodium salt A | Room Temp | 275 | 300 | 115 |
| | | 14 hrs., 70° C | 270 | 247 | |
| Clay No. 4 | Tetrasodium salt A | Room Temp | 210 | 170 | |
| | | 14 hrs., 70° C | 200 | 175 | |
| | Tetrasodium salt B | Room Temp | 210 | 160 | |
| | | 14 hrs., 70° C | 200 | 155 | |

(Gel strength measured on a modified Stormer viscometer)

From the above figures in Table 3, it may be seen that there was a considerable decrease in the 10 minute gel strength of all of the above muds when treated in accordance with the present invention. A substantial decrease in the gel strength was noticed when only 0.4% by weight of the salt had been added to a 70 lb. mud with additional decrease in gel strength occurring at higher temperatures or when larger quantities of the ethylene diamine tetraacetic acid salts were added.

In a fourth series of tests, a 70 lb./cu. ft. oil-in-water emulsion was made up containing 30% gas oil. Treated and untreated portions of the mud were tested with regard to the Bingham yield stress and the filter loss during a 30 minute API test.

Table 4

[70 lb./cu. ft. oil-in-water emulsion mud containing 30% oil.]

| Mud Treatment | Conditions | Bingham Yield Stress | 30 Minutes, API Filter Loss (ml.) | |
|---|---|---|---|---|
| | | | Water | Oil |
| No treatment | Room Temp | 514 | 12.8 | 1.2 |
| | 14 hrs., 70° C | 404 | 12.5 | 1.0 |
| 0.4% tetrasodium salt A | Room Temp | 132 | 7.8 | 1.1 |
| | 14 hrs., 70° C | 66 | 7.0 | 1.1 |
| 0.4% disodium salt | Room Temp | 180 | 5.9 | 0.5 |
| | 14 hrs., 70° C | 128 | 6.1 | 1.0 |
| 0.4% tetrasodium salt B | Room Temp | 24 | 11.0 | 1.0 |
| | 14 hrs., 70° C | 16 | 10.2 | 1.3 |

From the above table, it may be noted that there is a considerable decrease in the yield stress of an oil-in-water emulsion mud when salts are added thereto in accordance with the present invention. The decrease in yield stress becomes more pronounced at higher temperatures. Additionally, it may be seen that there was considerable improvement or decrease in the filter loss of two of the portions of mud which had been treated while there had been only a slight improvement in the filter loss of the other treated portion of mud.

I claim as my invention:

1. A water-base drilling mud for well drilling operations, said mud consisting essentially of sufficient water to maintain the mud as a fluid, sufficient inorganic solids suspended in said water to form a filter cake on the wall of the well, and the tetra alkali metal salt of ethylene diamine tetraacetic acid in an amount sufficient to maintain the viscosity of the drilling mud at a value sufficiently low for circulation purposes.

2. A water-base drilling mud comprising an aqueous fluid mixture consisting essentially of suspended inorganic solids which form a filter cake on the wall of a well, and from 0.02 to 4% by weight of the tetra sodium salt of ethylene diamine tetraacetic acid.

3. A water-base drilling mud for well drilling operations, said mud consisting essentially of sufficient water to maintain the mud as a fluid, sufficient clayey material to form a filter cake on the wall of the well, and a tetra alkali metal salt of ethyene diamine tetraacetic acid in an amount sufficient to maintain the viscosity of the driling mud at a value sufficiently low for circulation purposes.

4. A water-base drilling mud for well drilling operations, said mud consisting essentially of sufficient water to maintain the mud as a fluid, sufficient clayey material to form a filter cake on the wall of the well, the tetra sodium salt of ethylene diamine tetraacetic acid in an amount sufficient to maintain the viscosity of the drilling mud at a value sufficiently low for circulation purposes.

5. A water-base drilling mud for well drilling operations, said mud consisting essentially of sufficient water to maintain the mud as a fluid, sufficient clayey material to form a filter cake on the wall of the well, and the tetra potassium salt of ethylene diamine tetraacetic acid in an amount sufficient to maintain the viscosity of the drilling mud at a value sufficiently low for circulation purposes.

6. In a process for drilling a well with well drilling tools wherein there is circulated in the well a water-base drilling mud containing colloidal particles of clayey material suspended in sufficient water to render the same circulatable, the method of forming the filter cake on the wall of said well to decrease the loss of fluid from said drilling mud contained therein into surrounding earthen formations which comprises admixing with said drilling mud and interacting therewith the tetra sodium salt of ethylene diamine tetraacetic acid in an amount sufficient to lower the filter loss through said filter cake and to maintain the viscosity of said mud at such value that it may be readily circulated, and contacting said wall of said well with the resulting drilling mud to form said filter cake thereon.

7. An oil-in-water drilling emulsion mud consisting essentially of a predominant water phase, an oil phase and the tetra sodium salt of ethylene diamine tetraacetic acid in an amount between 0.02 and 4% by weight of the total weight of the mud.

(References on following page)

References Cited in the file of this patent

UNITED STATES PATENTS

| | | |
|---|---|---|
| 2,331,279 | Wayne | Oct. 12, 1943 |
| 2,375,616 | Booth | May 8, 1945 |
| 2,696,468 | Fischer | Dec. 7, 1954 |

OTHER REFERENCES

Sequestrene Metal Complexes—Technical Bulletin—December 1952, pub. by Alrose Chemical Co., Providence, Rhode Island, 3 pages.